United States Patent
Jagtap et al.

(10) Patent No.: US 11,500,773 B2
(45) Date of Patent: Nov. 15, 2022

(54) METHODS AND SYSTEMS FOR MAINTAINING CACHE COHERENCY BETWEEN NODES IN A CLUSTERED ENVIRONMENT BY PERFORMING A BITMAP LOOKUP IN RESPONSE TO A READ REQUEST FROM ONE OF THE NODES

(71) Applicant: Veritas Technologies LLC, Santa Clara, CA (US)

(72) Inventors: Bhushan Jagtap, Maharashtra (IN); Mark Hemment, Chatteris (GB); Anindya Banerjee, Maharashtra (IN); Ranjit Noronha, Maharashtra (IN); Jitendra Patidar, Maharashtra (IN); Kundan Kumar, Bihar (IN); Sneha Pawar, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 85 days.

(21) Appl. No.: 16/939,737

(22) Filed: Jul. 27, 2020

(65) Prior Publication Data
US 2020/0356481 A1     Nov. 12, 2020

Related U.S. Application Data

(63) Continuation of application No. 15/476,447, filed on Mar. 31, 2017, now Pat. No. 10,725,915.

(51) Int. Cl.
*G06F 12/08* (2016.01)
*G06F 12/0815* (2016.01)

(52) U.S. Cl.
CPC .. *G06F 12/0815* (2013.01); *G06F 2212/1021* (2013.01); *G06F 2212/1024* (2013.01); *G06F 2212/1032* (2013.01); *G06F 2212/284* (2013.01); *G06F 2212/608* (2013.01)

(58) Field of Classification Search
CPC ......... G06F 12/0815; G06F 2212/1021; G06F 2212/1024; G06F 2212/1032; G06F 2212/284; G06F 2212/608; G06F 12/0828; G06F 12/0868; G06F 2212/154; G06F 2212/264; G06F 2212/311
USPC .......... 711/118, 119, 145; 709/217, 218, 219
See application file for complete search history.

(56) References Cited

U.S. PATENT DOCUMENTS

| | | | |
|---|---|---|---|
| 5,893,160 A | 4/1999 | Loewenstein et al. | |
| 6,996,674 B2 | 2/2006 | Chiu et al. | |
| 2002/0174305 A1 | 11/2002 | Vartti | |
| 2003/0033487 A1 | 2/2003 | Pfister et al. | |
| 2003/0097531 A1 | 5/2003 | Arimilli et al. | |
| 2003/0131201 A1 | 7/2003 | Khare et al. | |
| 2004/0202013 A1 | 10/2004 | Dove et al. | |
| 2007/0185872 A1 | 8/2007 | Ho et al. | |

(Continued)

*Primary Examiner* — Jae U Yu

(57) ABSTRACT

Disclosed herein are methods, systems, and processes to provide coherency across disjoint caches in clustered environments. It is determined whether a data object is owned by an owner node, where the owner node is one of multiple nodes of a cluster. If the owner node for the data object is identified by the determining, a request is sent to the owner node for the data object. However, if the owner node for the data object is not identified by the determining, selects a node in the cluster is selected as the owner node, and the request for the data object is sent to the owner node.

24 Claims, 9 Drawing Sheets

(56) References Cited

U.S. PATENT DOCUMENTS

| | | |
|---|---|---|
| 2010/0232288 A1 | 9/2010 | Coatney et al. |
| 2012/0042062 A1* | 2/2012 | Borade ................ G06F 16/16 |
| | | 709/224 |
| 2013/0275543 A1 | 10/2013 | Jain |
| 2014/0130055 A1 | 5/2014 | Guha |
| 2014/0173185 A1 | 6/2014 | Belluomini et al. |
| 2014/0173213 A1 | 6/2014 | Beveridge |
| 2014/0258224 A1 | 9/2014 | Song et al. |
| 2014/0297611 A1 | 10/2014 | Abbour et al. |
| 2015/0081945 A1 | 3/2015 | Cheng et al. |
| 2015/0169497 A1 | 6/2015 | Fried et al. |
| 2016/0092488 A1 | 3/2016 | Sun et al. |
| 2016/0162562 A1 | 6/2016 | Hattori |
| 2016/0246717 A1 | 8/2016 | Patil et al. |
| 2017/0004083 A1* | 1/2017 | Jain ................... G06F 12/0868 |
| 2017/0083362 A1 | 3/2017 | Busaba et al. |
| 2017/0116095 A1 | 4/2017 | Schatz et al. |
| 2017/0168939 A1 | 6/2017 | Jalal et al. |
| 2017/0185344 A1 | 6/2017 | Kirshenbaum |
| 2017/0371787 A1 | 12/2017 | Kalyanasundharam et al. |
| 2018/0095906 A1 | 4/2018 | Doshi et al. |
| 2018/0143905 A1* | 5/2018 | Roberts ............... G06F 12/0822 |

\* cited by examiner

Data Object Ownership Table 210

| File Field 215 | Data Object Field 220 | Owner Field 225 | Lock Manager Field 230 |
|---|---|---|---|
| File A | Data Object 235(1) | Node 110(1) | Node 110(4) |
|  | Data Object 235(2) | Node 110(2) | Node 110(3) |
|  | Data Object 235(3) | Node 110(3) | Node 110(5) |
| File B | Data Object 235(6) | Node 110(2) | Node 110(1) |
|  | Data Object 235(7) | Node 110(2) | Node 110(4) |
| ⋮ | ⋮ | ⋮ | ⋮ | ns
METHODS AND SYSTEMS FOR MAINTAINING CACHE COHERENCY BETWEEN NODES IN A CLUSTERED ENVIRONMENT BY PERFORMING A BITMAP LOOKUP IN RESPONSE TO A READ REQUEST FROM ONE OF THE NODES

CROSS-REFERENCE TO RELATED APPLICATIONS

The present patent application is a continuation of U.S. Pat. No. 10,725,915, filed on Mar. 31, 2017, issued Jul. 28, 2020, and entitled "Coherency Across Disjoint Caches In Clustered Environments," which is incorporated by reference herein in its entirety and for all purposes.

FIELD OF THE DISCLOSURE

The present disclosure is related to distributed storage in clustered environments. In particular, this disclosure is related to providing coherency across disjoint caches in a cluster.

DESCRIPTION OF THE RELATED ART

A cluster is a distributed computing system with several nodes that work together to provide processing power and shared storage resources by spreading processing load over more than one node, as well as eliminating or at least minimizing single points of failure. Therefore, applications running on multiple nodes can continue to function despite a problem with one node (or computing device) in the cluster.

Application throughput in such clustered environments can be improved by storing data in caches maintained by nodes in the clusters. For example, requests for data can be served from a Solid State Drive (SSD) implemented as a cache by one or more nodes in a cluster (as opposed to retrieving the data from a slower backend storage device), thus reducing input/output (I/O) latency.

Existing caching solutions have several limitations. For example, caches implemented in such computing environments are local (each node in a cluster maintains its own cache locally). There exists no mechanism for various disjoint caches in a cluster to interact with each other in a meaningful manner to share data (and data access information) to avoid I/Os to slower backend storage devices. Thus, latency and throughput are negatively affected.

SUMMARY OF THE DISCLOSURE

Disclosed herein are methods, systems, and processes to provide coherency across disjoint caches in clustered environments. One such method involves determining whether a data object is owned by an owner node, where the owner node is one of multiple nodes of a cluster. In this example, if the owner node for the data object is identified by the determining, the method sends a request to the owner node for the data object. However, if the owner node for the data object is not identified by the determining, the method selects a node in the cluster as the owner node, and sends the request for the data object to the owner node.

In one embodiment, the method instructs the owner node to cache the data object prior to sending the request to the owner node for the data object, if owner node is not identified by the determining. In this example, the method receives the request for the data object from an application, determines whether a master node maintains information identifying the owner node for the data object, and selects the node in the cluster as the owner node if the master node does not maintain information identifying the owner node for the data object.

In another embodiment, the method determines that the owner node takes a lock on the data object and the lock information is maintained by a distributed lock manager (e.g., a master node). In some embodiments, selecting the node as the owner node is based on a random selection method, a circular selection method, or a cache characteristic selection method.

In other embodiments, selection of the node in the cluster as the owner node is performed by a reader node, and a subsequent request for the data object from another reader node is serviced by the owner node by virtue querying the master node for the lock information in the distributed lock manager and determining that the owner node holds the lock.

In certain embodiments, the owner node, the master node, the reader node, and another reader node are part of the nodes, the owner node is communicatively coupled to a local storage device which is a Solid State Drive (SSD), and the nodes, which may have SSDs, are communicatively coupled to a shared storage device which is a Hard Disk Drive (HDD).

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
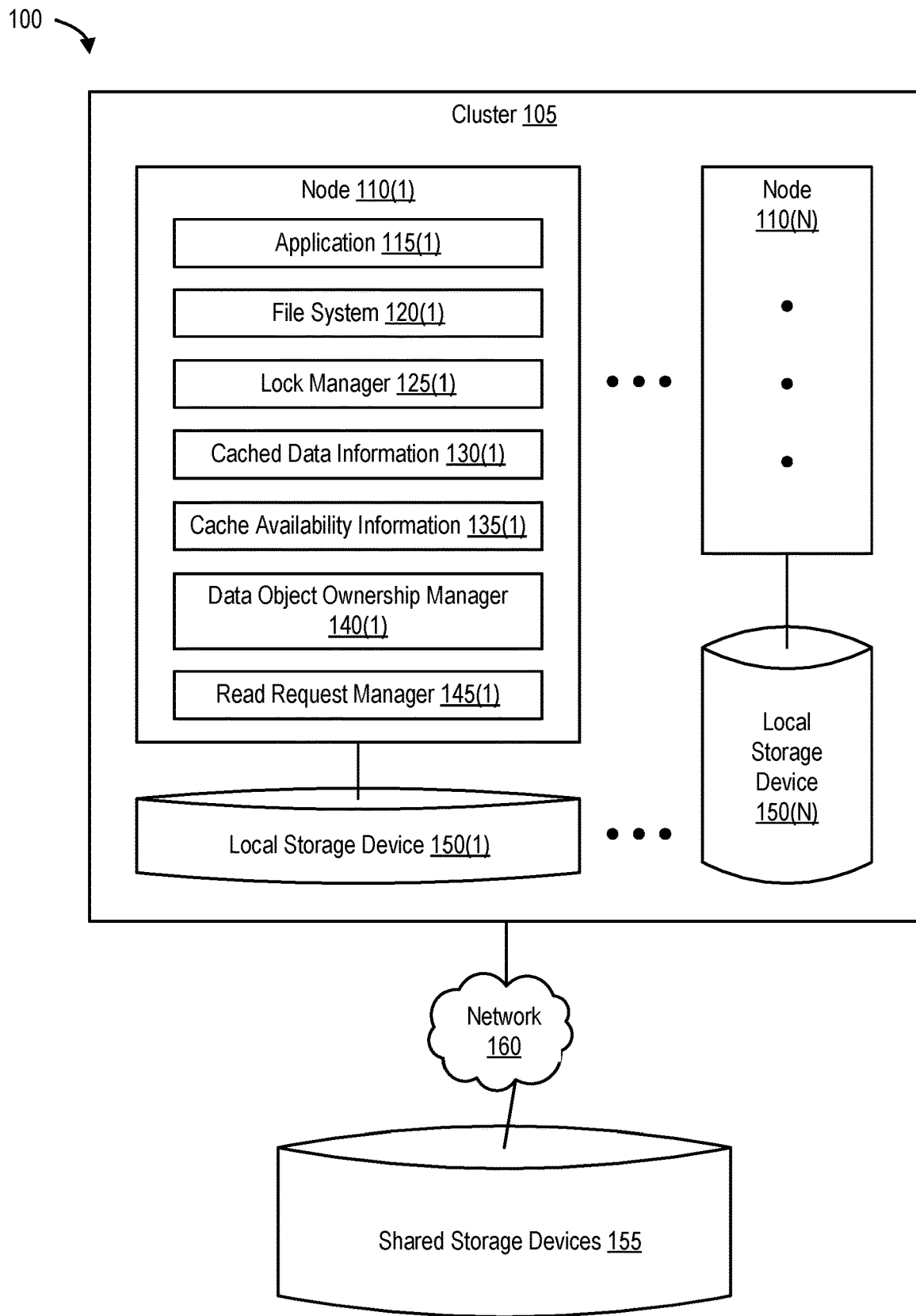
FIG. 1 is a block diagram 100 of a computing system for providing coherency across caches in a clustered environment, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A persistent caching solution (e.g., VxFS) improves overall throughout of applications by caching data objects in a cache. Storing data objects in this manner reduces input/output (I/O) latency by using a caching layer (e.g., high end and expensive arrays) on top of slower backend storage devices (e.g., low end commodity storage). In this manner, persistent caching solutions can be used to reduce I/O bottlenecks created by reading data from and writing data to backend storage devices (e.g., a Hard Disk Drive (HDD)). Servicing an application I/O from a cache (e.g., a Solid State Drive (SSD)) generally improves throughput as SSD media provide lower latency than magnetic media (e.g., a HDD).

As noted, one limitation of existing persistent caching solutions, among many, is that caches are implemented locally. These caches do not interact and/or communicate with each other to share data and data access information. Also, there is no mechanism to exploit data resident in other caches in a cluster. What's more, cold and conflict misses must always be serviced from an underlying storage device. For instance, a data object maintained on a local cache implemented by a node in a cluster cannot be used to service a read request generated by another node in the cluster. The other node has to read the data object from backend storage, and retrieve the data object from the backend storage (e.g., over a network).

Because cache visibility in existing persistent caching solutions (e.g., asymmetric SSD configurations) is limited to a local node that implements the cache, a given data object already cached in another node's cache cannot be accessed to service I/O operations (e.g., using high speed interconnects). Therefore, unfortunately, this communication gap between disjoint caches in clustered environments can significantly increase the number of I/Os to backend storage and can also result in the under-utilization of caches.

Disclosed herein are methods, systems, and processes to provide coherency across disjoint caches in clustered environments.

Example of a Persistent Distributed Read Cache in a Cluster

FIG. 1 is a block diagram 100 of a computing system for providing coherency across caches in a clustered environment, according to one embodiment. The system of FIG. 1 implements a persistent distributed read cache for a cluster file system. As shown in FIG. 1, a cluster 105 includes nodes 110(1)-(N). Node 110(1) is communicatively coupled to a local storage device 150(1). In this example, local storage device 150(1) is a cache and is implemented using a Solid State Drive (SSD). However, it must be noted that not all nodes in cluster 105 need to be communicatively coupled to a local storage device, and other storage devices other than SSDs can be used to implement caches in cluster 105.

Cluster 105 is also communicatively coupled to shared storage devices 155 using network 160. In one embodiment, shared storage devices 155 include one or more storage devices such as Hard Disk Drives (HDDs) that function as backend storage for nodes 110(1)-(N) executing in cluster 105. Shared storage devices 155 can include other types of storage devices other than HDDs.

As shown in FIG. 1, node 110(1) includes at least an application 115(1), a file system 120(1), a lock manager 125(1), cached data information 130(1), cache availability information 135(1), a data object ownership manager 140(1), and a read request manager 145(1). Application 115(1) can be a standalone application executing on node 110(1), or can be a distributed application executing across two or more nodes in cluster 105. In one embodiment, file system 120(1) is a Cluster File System (CFS) and keeps track of files and data objects accessed by application 115(1), and other applications. In another embodiment, lock manager 125(1) is a Global Lock Manager (GLM) and is a distributed locking mechanism that is used for metadata and cache coherency across multiple nodes in cluster 105. For example, lock manager 125(1) provides a mechanism to ensure that all nodes have a consistent view of file system 120(1), and can be used to designate exclusive ownership of certain data objects maintained by file system 120(1) to one or more nodes in cluster 105.

Cached data information 130(1) includes information or metadata that identifies data objects that are cached in local storage device 150(1) by node 110(1). Cache availability information 135(1) includes information about a cache implemented on local storage device 150(1). For example, cache availability information 135(1) can include information such as size of a cache, used cache space, free cache space, and the like. In one embodiment, when the cache of a given node is brought online, the node broadcasts a message to other nodes in cluster 105 with the node's cache availability information. This broadcast can take place when the cache is available for sharing and also when the cache is no longer available for sharing. Cache availability information can be maintained in a specific bitmap per file system on multiple nodes in cluster 105 (e.g., a consistent copy of the bitmap can be maintained on all nodes per file system). When a node leaves cluster 105, the bitmap can be updated cluster-wide as part of cluster reconfiguration.

Data object ownership manager 140(1) assigns one or more nodes in cluster 105 ownership of one or more data objects. For example, if File A maintained by file system 120(1) consists of data objects A and B, data object ownership manager 140(1) can assign or designate ownership of data object A to node 110(2), ownership of data object B to node 110(3), and the like. This "ownership" information can also be maintained using a bitmap, and this bitmap can be shared among the various nodes in cluster 105. Read request manager 145(1) manages read requests generated by application 115(1). For example, read request manager 145(1) can be used to identify an owner node of a given data object, and can be used to instruct the owner node to cache the identified data object and service a read request for the identified data object.

Figures 2A, 2B:
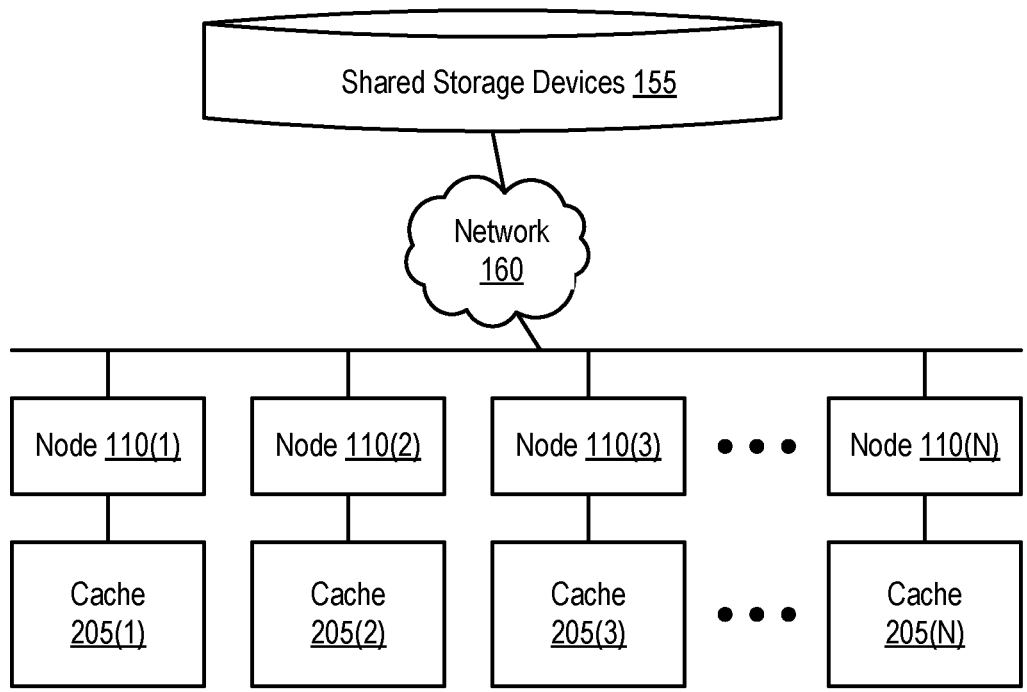
FIG. 2A is a block diagram 200A of a distributed storage environment, according to one embodiment of the present disclosure.
FIG. 2B is a table 200B illustrating data object ownership, according to one embodiment of the present disclosure.

FIG. 2A is a block diagram 200A of a distributed storage environment, according to one embodiment. As shown in FIG. 2A, nodes 110(1)-(N) each have a cache 205(1)-(N), respectively, and are communicatively coupled to shared storage devices 155 using network 160. However, as noted above, each node need not have a (local) cache. For example, node 110(4) need not have a cache, but can still receive one or more data objects cached in caches 205(1) and 205(2) by nodes 110(1) and 110(2), respectively, to service a read request generated by an application executing on node 110(4) (e.g., application 115(4)), for example.

Example of Owner Node Selection

In one embodiment, a reader node is a node in cluster 105 that requests (and requires) one or more data object to service and fulfill a read request (e.g., generated by an application). When a reader node detects or receives a request for a data object, the reader node accesses and queries a master node for the data object in a distributed lock manager (e.g., provided by a master node) in cluster 105 to determine whether the master node has information that identifies an owner node for the data object. In this example, the owner node is a node in cluster 105 other than the reader node that "owns" (and caches) the data object. The master node is a node in cluster 105 other than the reader node and the owner node, and maintains a locking mechanism for the data object that permits the data object to be accessed from the owner node. Any node in cluster 105 can a reader node, an owner node, or a master node.

The master node is part of a lightweight GLM and maintains locking information that identifies locks for data objects held by various "owner" nodes in cluster 105. Once a lock for a data object is assigned to an owner node by the master node, no other node in 105 can hold the lock for that data object. Therefore, a node which is designated or selected as an owner for a data object (e.g., a particular portion of a file), uses this lightweight locking mechanism to "own" that data object.

As previously noted, a reader node accesses and queries a master node in cluster 105 to determine whether the master node has information that identifies an owner node for the data object in question. If the master node does not have (or provide) information that identifies an owner node for the data object, the reader node selects a node in cluster 105 as the owner node for that data object. In certain embodiments, the reader node can select an owner node for the data object based on various policies and/or methodologies. For example, the owner node can be selected by the reader node randomly, using a Round-robin method, based on cache characteristic(s) of a given node, or based on a preference given to a local node.

For example, a reader node can select any node in cluster 105 randomly as an owner node for a data object. The reader node can also select a node in cluster 105 in a circular manner (e.g., using a Round-robin methodology). In addition, a node can be selected by the reader node as the owner node based on cache characteristic(s) of a given node (e.g., based on cache available information 135(1)). For instance, a node which has the largest free cache space in its cache, a node which stores the smallest number of data objects in its cache, or a node whose cache is not being actively utilized, and the like, can be policies that can be used by the reader node to select a given node as the owner node for the data object.

FIG. 2B is a table 200B illustrating data object ownership, according to one embodiment. As shown in FIG. 2B, data object ownership table 210 includes at least a file field 215, a data object field 220, an owner field 225, and a lock manager field 230. For example, File A includes data objects 235(1), 235(2), and 235(3). Node 110(1) is selected as an owner node for data object 235(1) by a reader node, node 110(2) is selected as an owner node for data object 235(2) by a reader node, and node 110(3) is selected as an owner node for data object 235(3) by a reader node. The master node that maintains information indicating that node 110(1) is an owner node for data object 235(1) is node 110(4), the master node that maintains information indicating that node 110(2) is an owner node for data object 235(2) is node 110(3), and the master node that maintains information indicating that node 110(3) is an owner node for data object 235(3) is node 110(5). Similarly, File B includes data objects 235(6) and 235(7). Node 110(2) is selected as an owner node for data objects 235(6) and 235(7) by a reader node. The master nodes that maintains information indicating that node 110(2) is an owner node for data objects 235(6) and 235(7) are nodes 110(1) and 110(4), respectively. In this manner, each data object of a file maintained by a cluster file system can be assigned or designated an owner node, which can be selected by a reader node (e.g., a node requesting a data object) using one or more of the methodologies discussed above. In one embodiment, data object ownership table 210 is a bitmap and can be maintained by a master node, and a selected owner node. In other embodiments, a consistent copy of data object ownership table 210 can be shared between multiple nodes in cluster 105, and can be updated (e.g., upon a node entering or leaving cluster 105) during cluster reconfiguration.

Example of Read Request Processing

Figure 3A:
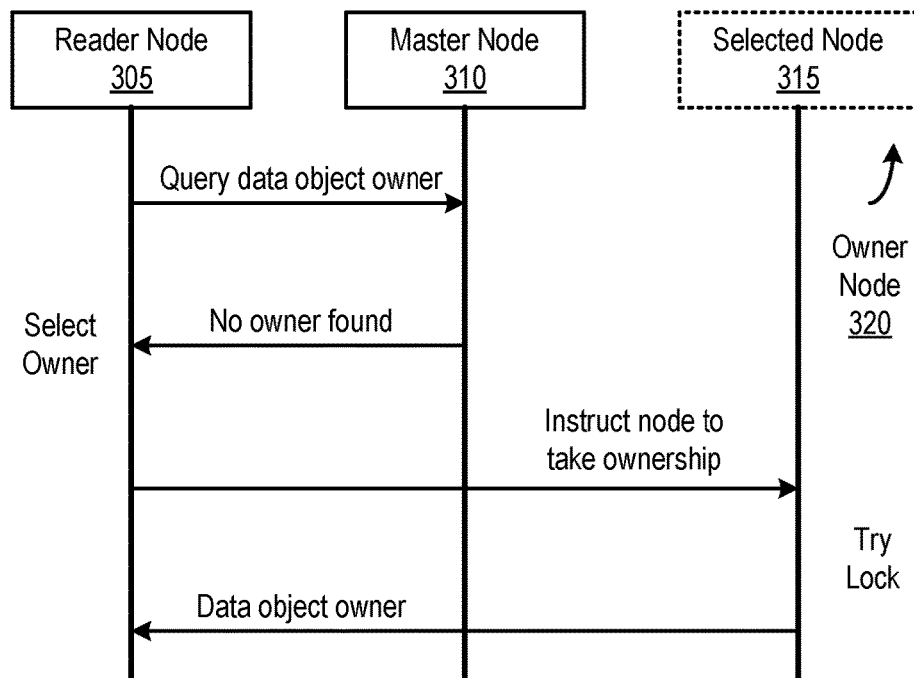
FIG. 3A is a block diagram 300A that illustrates selection of an owner node, according to one embodiment of the present disclosure.

FIG. 3A is a block diagram 300A that illustrates selection of an owner node to service read requests from disjoin caches in a cluster, according to one embodiment. As shown in FIG. 3A, a reader node 305 first queries a master node 310 for an owner of the data object (e.g., query data object owner). If no owner is found by master node 310, reader node 305 selects a node in cluster 105 as the owner node, and instructs a selected node 315 to take ownership (of the data object). Selected node 315 accesses master node 310 to determine whether it can take ownership of the data object (e.g., using a lightweight GLM procedure). If selected node 315 is granted a lock of the data object, then selected node 315 is designated as an owner node 320, and reader node 305 receives a confirmation from owner node 320 and/or master node 310 that the owner node selection process is successful. Once the owner node selection process is successful, read requests for the data object (current and subsequent) can be fulfilled by owner node 320, regardless of which reader node makes the read request.

Figure 3B:
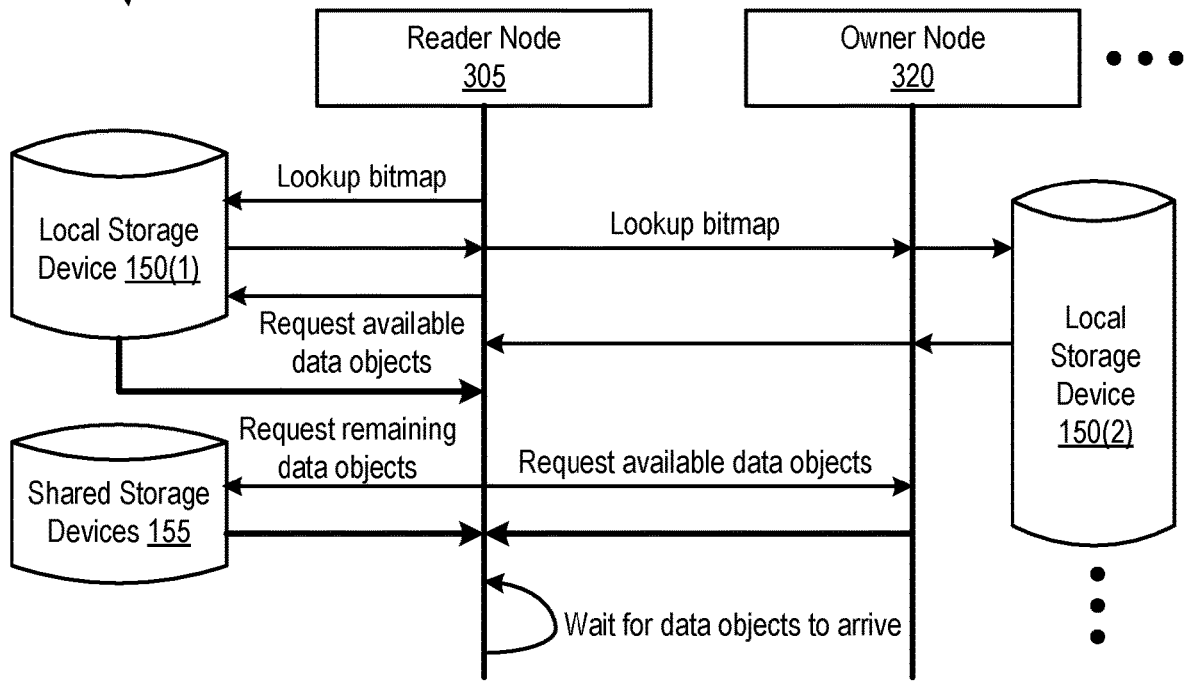
FIG. 3B is a block diagram 300B that illustrates performing input/output (I/O) operations using an owner node, according to one embodiment of the present disclosure.

FIG. 3B is a block diagram 300B that illustrates performing input/output (I/O) operations using an owner node, according to one embodiment. Reader node 305 detects or receives a request for a data object (e.g., a portion of a file from an application). Reader node 305 performs a bitmap lookup for a range of data available in a local cache (e.g., local storage device 150(1)), and serves the data object if the data object is available in the local cache of reader node 305. However, if the data object is not found in the local cache of reader node 305, reader node 305 queries master node 310 to identify the owner of the data object. If the data object does not have an owner, reader node 305 selects a node for ownership (e.g., owner node 320), and requests the selected node to take ownership of the data object. If the selected node fails to take ownership of the data object, reader node 305 restarts the owner node selection process. Upon successful owner node selection, reader node 305 queries the data object at the cache of owner node 320 (e.g., local storage device 150(2)) via bitmap lookup on the cache of owner node 320. If the data object is available on the cache of owner node 320, reader node 305 issues a Remote Direct Memory Access (RDMA) request to read the data object from local storage device 150(2) (e.g., lookup bitmap and request available data objects in a single message).

In certain embodiments, the reader node retrieves data objects that are available on the owner node and then requests the remaining data objects from shared storage devices. For example, when a reader node (e.g., N1) does not find an owner node by contacting a master node for the data object in distributed lock manager (e.g., N2), the reader node selects a node (e.g., N3) to be the owner. N3 tries to take a lock on the data object using distributed lock manager, and then N2 maintains information that N3 is holding the lock (and is hence the owner). In this example, N2 is the master node, because N2 provides the distributed lock manager.

It will be appreciated that any reader node (e.g., either N1, N2, N3 or N4) can communicate with N2 and determine that N3 is holding the lock and is hence the owner, and can then send a read request to N3. It should also be noted that a read request can cover multiple data objects and the reader node can asynchronously send read requests in parallel to owner nodes (which can be different nodes) for those data objects, and return the data objects to the application (when responses from all owner nodes have been received).

If the request data includes data objects other than the data object found on local storage device 150(2), reader node 305 reads the remaining data objects (if any) from backend storage (e.g., shared storage devices 155). Reader node 305 then waits for the asynchronous read requests to complete before fulfilling the (original) read request. In one embodiment, reader node 305 uses local storage device 150(1) (e.g., local cache) to hold copies of data objects owned by other owner node(s). This procedure further reduces network traffic as most of the requested data can be served from local caches. Reader node 305 can read ahead data from a remote cache (e.g., from local storage device 150(2)) if an application is requesting data in sequence (and if reader node 305 has a full file grant). In this example, reader node 305 can also maintain information about the number of sequential I/Os. If the number of sequential I/Os is more than a given threshold, reader node 305 can request read ahead of data object(s) from the remote cache. The population of data objects from multiple remote caches and backend storage can be performed in parallel, which further reduces the time required to populate the requested data.

In one embodiment, reader node 305 determines whether a data object (e.g., data object 235(1)) is owned by an owner node (e.g., owner node 320). If an owner node can be identified for the data object (e.g., by querying a master node), reader node 305 sends a request to the owner node for the data object. However, if an owner node for the data object is not identified by reader node 305, reader node 305 selects a node in cluster 105 as the owner node and sends the request for the data object to the owner node. In another embodiment, reader node 305 instructs owner node 320 to cache the requested data object prior to sending the request to owner node 320 for the data object (e.g., if a node is not identified as an owner node by a master node and has to be selected by the reader node). Reader node 305 receives the request for the data object from an application, determines whether a master node maintains information identifying the owner node for the data object, and selects a node in the cluster as the owner node if the master node does not maintain information identifying the owner node for the data object (e.g., selected node 315). It will be appreciated that in certain embodiments, the owner node, the master node, the reader node, and another reader node are part nodes 110(1)-(N) of cluster 105, owner node 320 is communicatively coupled to local storage device 150(2) which is an SSD and the nodes (which can also have SSDs) are communicatively coupled to shared storage devices 155 which includes one or more HDDs.

Example Processes of Owner Node Selection and Read Request Processing

Figure 4:
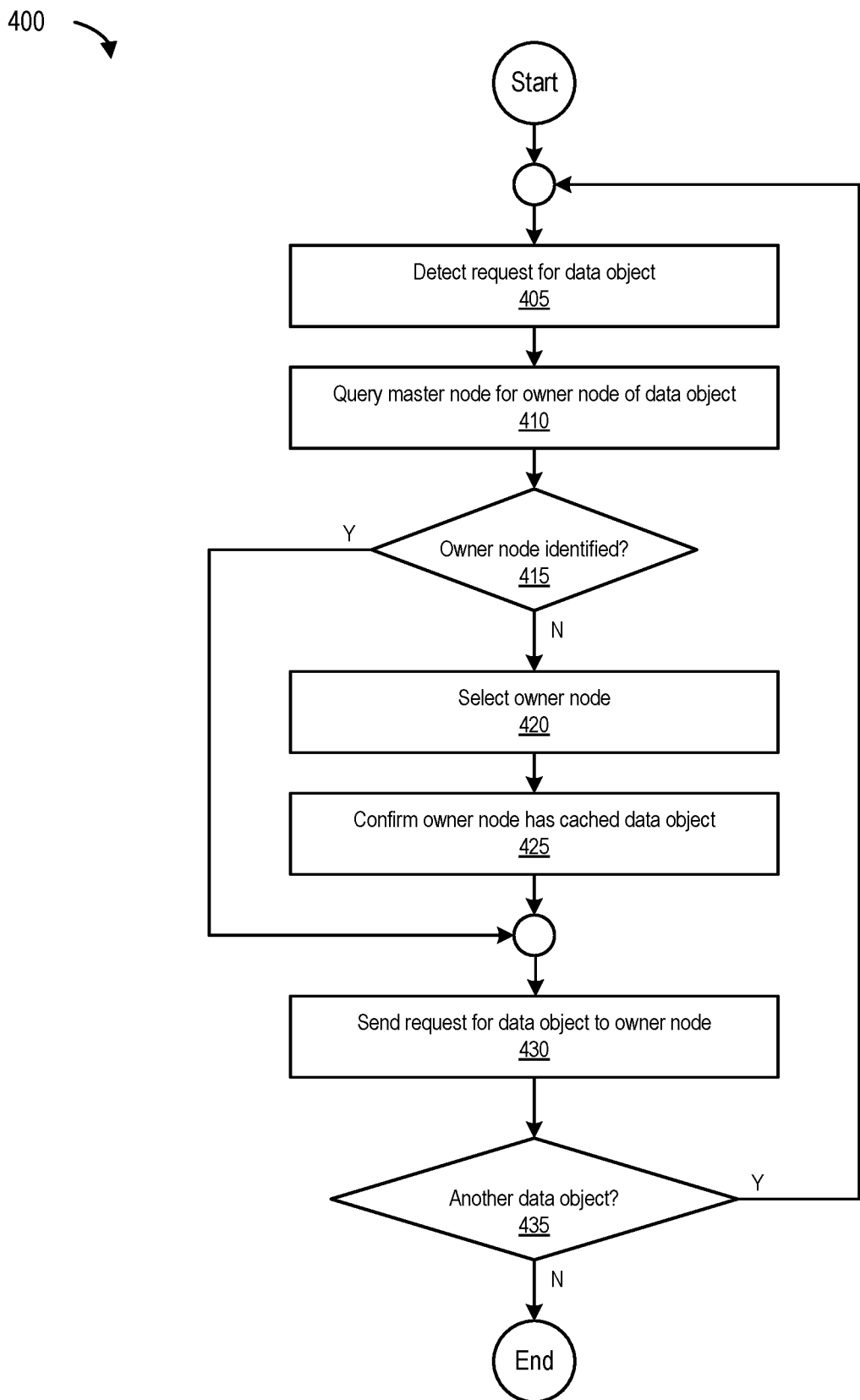
FIG. 4 is a flowchart 400 of a process for servicing read request from an owner node, according to one embodiment of the present disclosure.

FIG. 4 is a flowchart 400 of a process for servicing read request from an owner node, according to one embodiment. The process begins at 405 by detecting a request for a data object (e.g., read request manager 145(1) detects a request for one or more data objects that are part of one or more files). At 410, the process queries a master node (e.g., master node 310 that provides lightweight GLM capabilities) for an owner node of the data object. At 415, the process determines whether the owner node for the data object has been identified (e.g., using data object ownership manager 140(1)). If the owner node for the data object can be identified by the master node, the process loops to 430 and sends a request for the data object to the owner node, and at 435, determines if there is another data object to process. If there is another data object to process, the process loops to 405. Otherwise, the process ends.

However, if the owner node for the data object cannot be identified by the master node, the process, at 420, selects an owner node from nodes 110(1)-(N) in cluster 105 as the owner node (e.g., a node other than the master node and the reader node itself, for example, randomly, using a Round-robin methodology, or based on cache characteristic(s) of a given node, as discussed above). At 425, the process confirms that the (selected) owner node (e.g., owner node 320) has cached the data object (e.g., from shared storage device) by receiving a notification from owner node 320 that the data object has been cached and is available to be served to fulfill the (pending) read request. At 430, the process sends a request for the data object to the owner node, and at 435, determines if there is another data object to process (e.g., required to service the read request). If there is another data object to process, the process loops to 405. Otherwise, the process ends.

Figure 5:
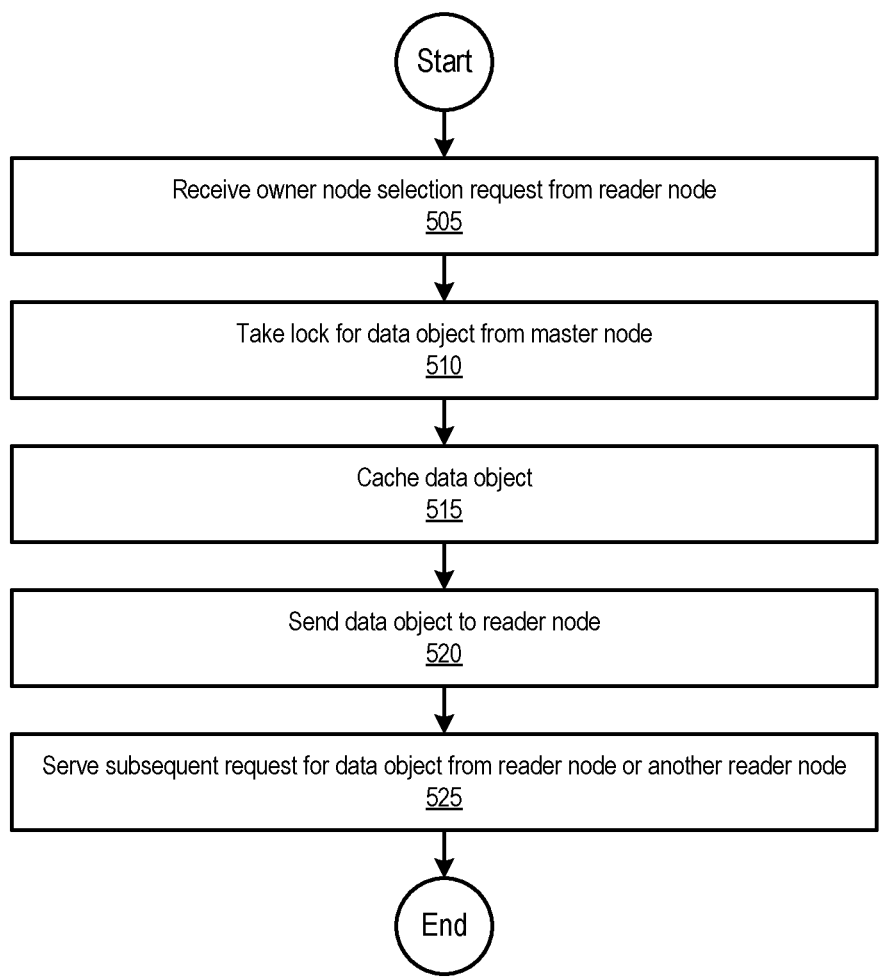
FIG. 5 is a flowchart 500 of a process for owner node selection, according to one embodiment of the present disclosure.

FIG. 5 is a flowchart 500 of a process for owner node selection, according to one embodiment. The process begins at 505 by receiving an owner node selection request from a reader node. At 510, the process takes a lock for the data object from a master node (e.g., lock manager 125(1) uses a lightweight GLM procedure to secure the lock). At 515, the process caches the data object (e.g., from shared storage devices 155). The process ends at 525 by serving subsequent read requests for the data object from the (current) reader node or from other reader nodes (e.g., from local cache).

Figure 6:
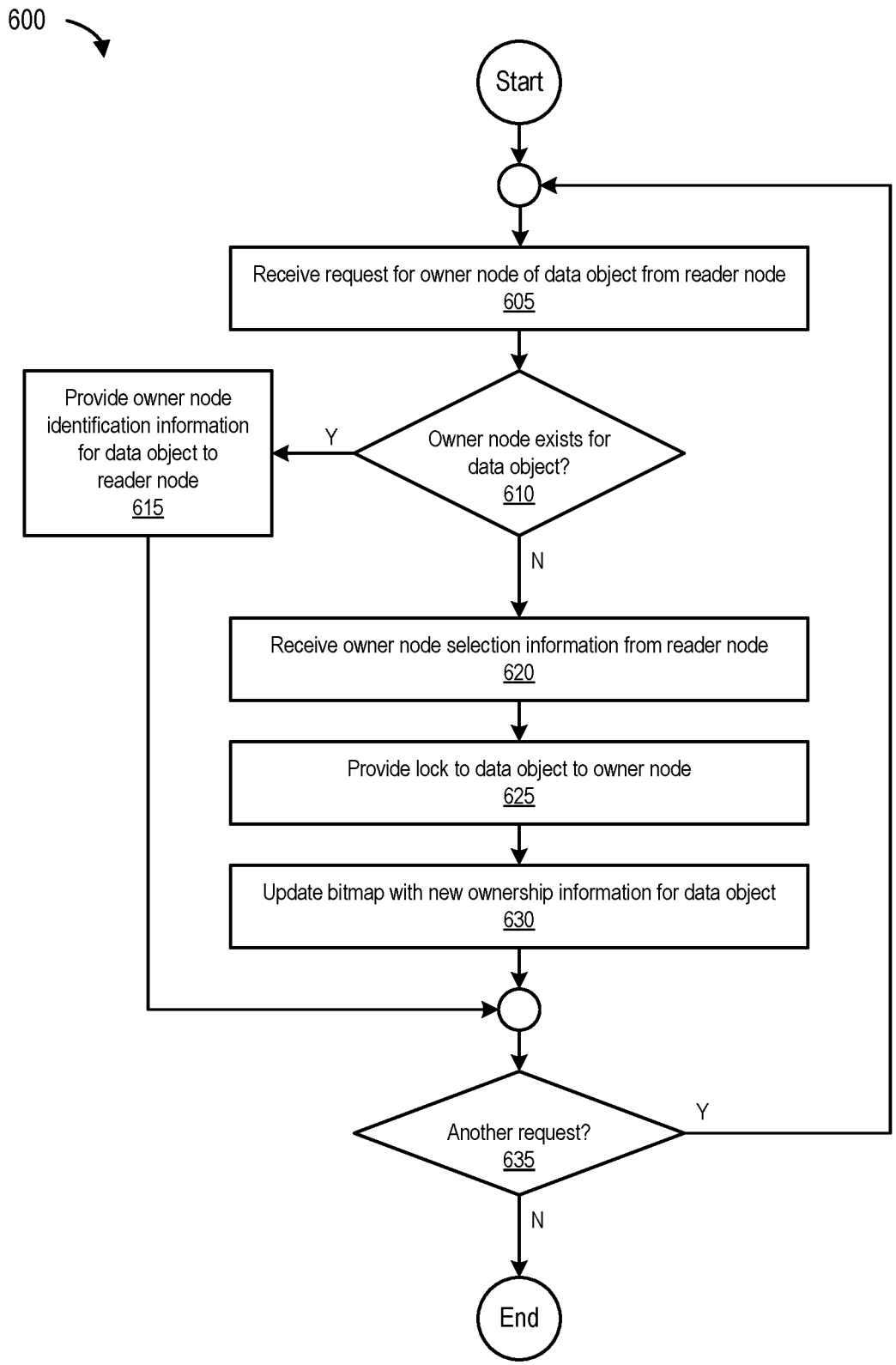
FIG. 6 is a flowchart 600 of a process for determining whether an owner node exists, according to one embodiment of the present disclosure.

FIG. 6 is a flowchart 600 of a process for determining whether an owner node exists, according to one embodiment. The process begins at 605 by receiving a request for an owner node of a data object from a reader node. At 610, the process determines if an owner node exists for the data object (e.g., based on which node has a lightweight GLM lock for the given data object). If an owner node exists for the data object, at 615, the process provides owner node identification information for the data object to the reader node, and at 635, determines whether there is another read request to process. If there is another read request to process, the process loops to 605. Otherwise, the process ends.

However, if an owner node does not exist for the data object, the process, at 620, receives owner node selection information from the reader node, and at 625, provides a lock to the data object to the (selected) owner node. At 630, the process updates the a bitmap with new ownership information for the data object (e.g., using data object ownership manager 140(1)), and at 635, determines whether there is another read request to process. If there is another read request to process, the process loops to 605. Otherwise, the process ends.

Figure 7:
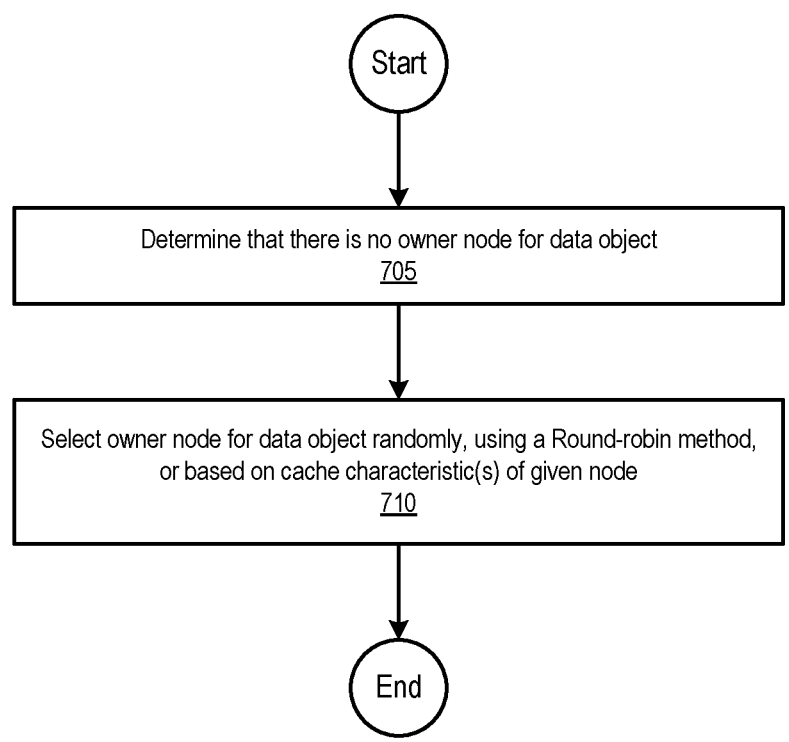
FIG. 7 is a flowchart 700 of a process for owner node selection. according to one embodiment of the present disclosure.

FIG. 7 is a flowchart 700 of a process for owner node selection. according to one embodiment. The process begins at 705 by determining that there is no owner node for a data object. The process ends at 710 by selecting an owner for the data object randomly, using a Round-robin methodology, or based on cache characteristic(s) of a given node.

Example of Write Request Processing

In one embodiment, with respect to processing write request, all cached copies of data across disjoint caches (e.g., caches 205(1)-(N)) are invalidated. Writes are then performed to backend storage (e.g., shared storage devices 155) and the (written) data is also copied to a local cache (e.g., to cache 205(1) by node 110(1)).

In another embodiment, if a given node writes data objects, the written data objects are copied to backend storage (e.g., to shared storage devices 155) and copied to the cache of the owner node (e.g., local storage device 150(2)). In this manner, the owner node can maintain an updated copy of the data objects, and another node in cluster 105 can request the data object(s) from the owner node instead of accessing the data objects from backend storage. In this example, the owner node updates the copy of the data objects by taking an exclusive PG LOCK, which invalidates other copies of the data object(s) in caches other than the cache of the owner node, thus eliminating stale copies of data in the cluster.

Example Computing Environment

Figure 8:
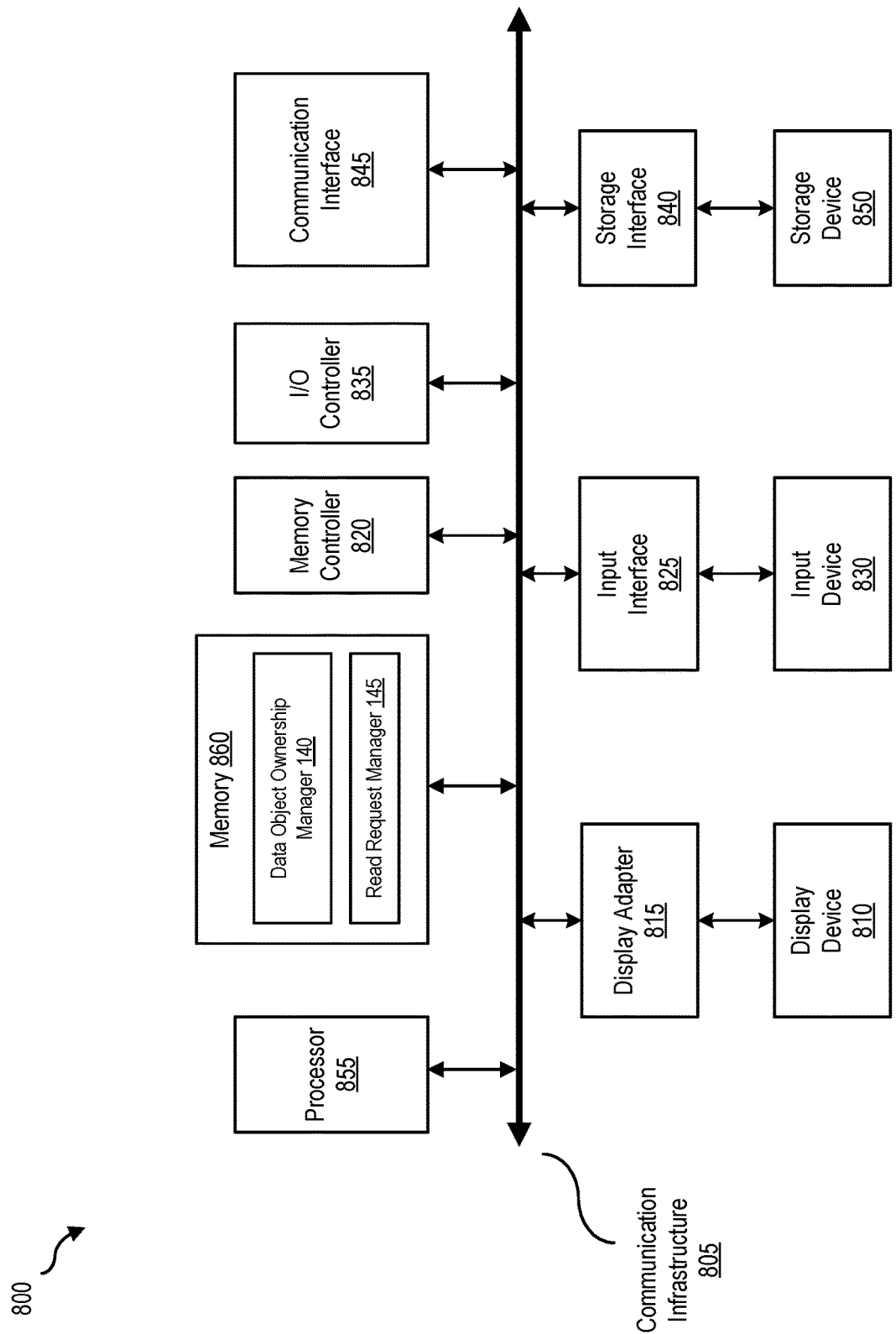
FIG. 8 is a block diagram 800 of a computing system, illustrating how a data object ownership manager and a read request manager can be implemented in software, according to one embodiment of the present disclosure.

FIG. 8 is a block diagram 800 of a computing system, illustrating how a data object ownership manager and a read request manager can be implemented in software, according to one embodiment. Computing system 800 can include a cluster 105 and nodes 110(1)-(N), and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes a data object ownership manager and/or a read request manager, computing system 800 becomes a special purpose computing device that is configured to provide coherency and data persistency across disjoint caches in clustered environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a data object ownership manager and/or a read request manager may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/ form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, shared storage devices 155, and/or local storage devices 150(1)-(N). When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
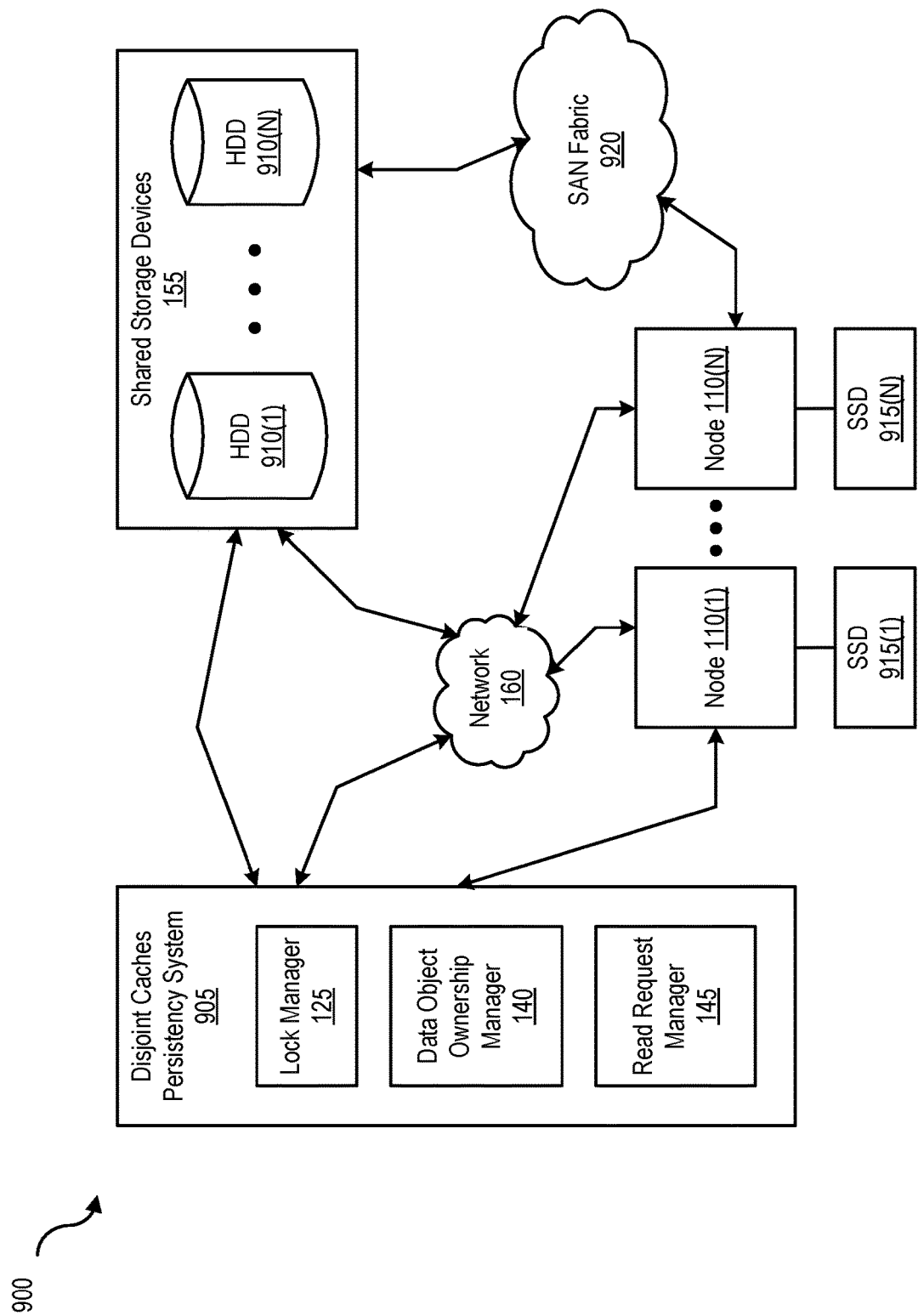
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with nodes 110(1)-(N), SSDs 915(1)-(N), and/or HDDs 910(1)-(N) such as Network File System (NFS), Server Message Block (SMB), or Common Internet File System (CIFS). Network 160 generally represents any type or form of computer network or architecture capable of facilitating communication between nodes 110(1)-(N), disjoint caches persistency system 905, and/or shared storage devices 155.

In certain embodiments, a communication interface, such as communication interface 845 in FIG. 8, may be used to provide connectivity nodes 110(1)-(N), disjoint caches persistency system 905, and/or shared storage devices 155, and network 160. The embodiments described and/or illustrated herein are not limited to the Internet or any particular network-based environment.

In some embodiments, network 160 can be a Storage Area Network (SAN). In other embodiments, disjoint caches persistency system 905 may be part of nodes 110(1)-(N), or may be separate. If separate, disjoint caches persistency system 905 and nodes 110(1)-(N) may be communicatively coupled via network 160. In one embodiment, all or a portion of one or more of the disclosed embodiments may be encoded as a computer program and loaded onto and executed by nodes 110(1)-(N), and/or disjoint caches persistency system 905, or any combination thereof. All or a portion of one or more of the embodiments disclosed herein may also be encoded as a computer program, stored on nodes 110(1)-(N), disjoint caches persistency system 905, HDDs 910(1)-(N), and/or SSDs 915(1)-(N), and distributed over network 160.

In some examples, all or a portion of nodes 110(1)-(N), disjoint caches persistency system 905, HDDs 910(1)-(N), and/or SSDs 915(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, data object ownership manager 140 and read request manager 145 may transform the behavior of nodes 110(1)-(N) in order to cause nodes 110(1)-(N) to provide coherency across disjoint caches in clustered environments. It will be appreciated that read requests can cover multiple data objects. For example, a reader node can asynchronously send read requests in parallel to owner nodes (e.g., different owner nodes) for data objects (owned by respectively owner nodes), and can then return (e.g., to an application) the requested data objects when responses from the owner nodes have been received.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method implemented in a computer system, comprising:
    broadcasting an availability of a cache of a node of a plurality of nodes of a cluster, wherein
        the availability of the cache is broadcast to one or more other nodes of the plurality of nodes;
    receiving a lookup request at the node, wherein
        the computer system implements the node,
        the lookup request is received from a reader node,
        the reader node is a one of the one or more other nodes, and
        the lookup request is for a bitmap stored at the node;
    performing a bitmap lookup on the bitmap;
    determining an availability of a data object in the cache, wherein
        the availability of the data object is determined based, at least in part, on a result of the bitmap lookup, and
        the cache is maintained in a local storage device of the node; and
    in response to the data object being available in the cache, permitting the reader node to access the data object from the cache.

2. The computer-implemented method of claim 1, wherein
    the permitting the reader node to access the data object comprises at least one of permitting the reader node to read the data object from the cache, or permitting the reader node to retrieve the data object from the cache.

3. The computer-implemented method of claim 1, further comprising:
    selecting the node as an owner node, wherein
        the selecting is performed by the reader node.

4. The computer-implemented method of claim 3, wherein
    the node is selected based on at least one of
        a random selection method,
        a circular selection method,
        a cache characteristic selection method, or
        node priority.

5. The computer-implemented method of claim 1, further comprising:
    attempting to acquire a lock for the data object, wherein
        the lock is managed by a global lock manager that implements a distributed locking mechanism in the cluster.

6. The computer-implemented method of claim 5, further comprising:
    in response to the lock being acquired,
        performing the permitting, wherein
            the permitting comprises
                receiving a query for the data object, wherein
                    the query is received from the reader node, and
                    in response to a result of the query indicating that the data object is available,
                        receiving a request to read the data object, and
                        in response to the request to read the data object,
                            providing the reader node with read access to the data object.

7. The computer-implemented method of claim 5, further comprising:
    in response to the lock not being acquired,
        selecting another node of the plurality of nodes, wherein
            the selecting is performed by the reader node, and
            the another node is one of the plurality of nodes other than then node.

8. The computer-implemented method of claim 5, further comprising:
    granting the lock, wherein
        the lock is granted by the global lock manager.

9. The computer-implemented method of claim 8, wherein
    the lock comprises lock information regarding the data object, and
    the lock information is maintained by the global lock manager.

10. The computer-implemented method of claim 1, further comprising:
    determining whether the data object is in a cache of the reader node;
    in response to the data object being in the cache of the reader node, serving the data object from the cache of the reader node; and
    in response to the data object not being in the cache of the reader node, sending the lookup request to the node.

11. The computer-implemented method of claim 10, further comprising:
    reading another data object from a shared storage device, wherein
        the shared storage device is accessible by the plurality of nodes, and
        the reading the another data object from the shared storage device is performed by the reader node;
    storing the another data object in the cache of the reader node; and
    serving the another data object from the cache of the reader node.

12. The computer-implemented method of claim 11, wherein
    the permitting the reader node to access the data object from the cache and the reading the another data object from the shared storage device are performed substantially simultaneously.

13. The computer-implemented method of claim 1, further comprising:

receiving an instruction to store the data object in the cache, wherein
the data object is read from a shared storage device, and
the shared storage device is accessible by the plurality of nodes.

14. The computer-implemented method of claim 1, further comprising:
sending a request to read the data object, wherein
the request to read the data object is sent to the node;
sending another lookup request with regard to another data object, wherein
the another lookup request is sent to another node of the plurality of nodes; and
in response to the another data object being available on the another node, sending another request to read the another data object, wherein
the another request to read the another data object is sent to the another node in parallel with the sending the request to read the data object.

15. The computer-implemented method of claim 1, wherein
the broadcasting is performed contemporaneously with at least one of
the node being brought online,
the cache being available for sharing, or
the cache no longer being available for sharing.

16. The computer-implemented method of claim 1, wherein
The broadcasting broadcasts cache availability information, and
the cache availability information comprises information regarding the cache that comprises at least one of
a size of a cache,
an amount of used cache space, or
an amount of free cache space.

17. The computer-implemented method of claim 1, wherein
The broadcasting broadcasts cache availability information, and
the cache availability information is
maintained in a specific bitmap, on a per-file system basis, on a number of nodes of the plurality of nodes, or
a consistent copy of the bitmap that is maintained, on a per-file system basis.

18. The computer-implemented method of claim 1, wherein
the broadcasting broadcasts cached data information, and
the cached data information comprises metadata that identifies one or more data objects that are cached tin the cache.

19. A non-transitory computer-readable storage medium, comprising program instructions, which, when executed by one or more processors of a computing system, perform a method comprising:
broadcasting an availability of a cache of a node of a plurality of nodes of a cluster, wherein
the availability of the cache is broadcast to one or more other nodes of the plurality of nodes;
receiving a lookup request at the node, wherein
the computer system implements the node,
the lookup request is received from a reader node,
the reader node is a one of the one or more other nodes, and
the lookup request is for a bitmap stored at the node;
performing a bitmap lookup on the bitmap;
determining an availability of a data object in the cache, wherein
the availability of the data object is determined based, at least in part, on a result of the bitmap lookup, and
the cache is maintained in a local storage device of the node; and
in response to the data object being available in the cache, permitting the reader node to access the data object from the cache.

20. The non-transitory computer-readable storage medium of claim 19, wherein
the permitting the reader node to access the data object comprises at least one of
permitting the reader node to read the data object from the cache, or
permitting the reader node to retrieve the data object from the cache.

21. The non-transitory computer-readable storage medium of claim 19, wherein the method further comprises:
attempting to acquire a lock for the data object, wherein
the lock is managed by a global lock manager that implements a distributed locking mechanism in the cluster.

22. The non-transitory computer-readable storage medium of claim 21, wherein the method further comprises:
in response to the lock being acquired,
performing the permitting, wherein
the permitting comprises
receiving a query for the data object, wherein
the query is received from the reader node, and
in response to a result of the query indicating that the data object is available,
receiving a request to read the data object, and
in response to the request to read the data object,
providing the reader node with read access to the data object.

23. The non-transitory computer-readable storage medium of claim 21, wherein the method further comprises:
in response to the lock not being acquired,
selecting another node of the plurality of nodes, wherein
the selecting is performed by the reader node, and
the another node is one of the plurality of nodes other than then node.

24. A computing system comprising:
one or more processors; and
a computer-readable storage medium coupled to the one or more processors,
comprising program instructions, which, when executed by the one or more processors, perform a method comprising
broadcasting an availability of a cache of a node of a plurality of nodes of
a cluster, wherein
the availability of the cache is broadcast to one or more other nodes of the plurality of nodes,
receiving a lookup request at the node, wherein
the computing system implements the node,
the lookup request is received from a reader node,
the reader node is a one of the one or more other nodes, and
the lookup request is for a bitmap stored at the node,
performing a bitmap lookup on the bitmap,
determining an availability of a data object in the cache, wherein the availability of the data object is determined based, at least in part, on a result of the bitmap lookup, and the cache is maintained in a local storage device of the node, and in response to the data object being available in the cache, permitting the reader node to access the data object from the cache.

* * * * *